(12) United States Patent
Sato et al.

(10) Patent No.: US 12,511,999 B2
(45) Date of Patent: Dec. 30, 2025

(54) ATTENTION CALLING SYSTEM AND ATTENTION CALLING METHOD

(71) Applicant: HONDA MOTOR CO., LTD., Tokyo (JP)

(72) Inventors: Masayuki Sato, Wako (JP); Takahiro Matsuoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 155 days.

(21) Appl. No.: 18/473,444

(22) Filed: Sep. 25, 2023

(65) Prior Publication Data

US 2024/0144828 A1 May 2, 2024

(30) Foreign Application Priority Data

Oct. 31, 2022 (JP) ................................. 2022-174698

(51) Int. Cl.
  *G08G 1/16* (2006.01)
  *G08B 21/18* (2006.01)
  *H04W 4/40* (2018.01)

(52) U.S. Cl.
  CPC ........... *G08G 1/166* (2013.01); *G08B 21/182* (2013.01); *G08G 1/16* (2013.01); *H04W 4/40* (2018.02)

(58) Field of Classification Search
  CPC ........ G08G 1/166; G08G 1/16; G08B 21/182; H04W 4/40
  See application file for complete search history.

(56) References Cited

U.S. PATENT DOCUMENTS

| 2001/0012976 A1* | 8/2001 | Menig ................... B60K 35/60 701/1 |
| 2005/0033517 A1 | 2/2005 | Kondoh et al. |
| 2009/0265107 A1 | 10/2009 | Matsuno |

(Continued)

FOREIGN PATENT DOCUMENTS

| JP | H11-42957 A | 2/1999 |
| JP | 2002-207077 A | 7/2002 |

(Continued)

OTHER PUBLICATIONS

Japanese Office Action dated Aug. 5, 2025 issued in corresponding Japanese application No. 2022-174698; English machine translation included (11 pages).

*Primary Examiner* — Rodney A Butler
(74) *Attorney, Agent, or Firm* — Rankin, Hill & Clark LLP

(57) ABSTRACT

An attention calling system includes a time headway (THW) acquisition unit that repeatedly acquires THW at predetermined time intervals, the THW being a value obtained by dividing an inter-vehicle distance between own vehicle and a preceding vehicle by vehicle speed of the own vehicle, an identification unit that identifies a type of the preceding vehicle, and a notification unit that outputs to an occupant of the own vehicle an approach alarm that notifies an approach to the preceding vehicle when the THW becomes a first threshold or less. The notification unit outputs the approach alarm by using the first threshold that takes different values depending on the type of the preceding vehicle, and/or by setting a saliency level that is a degree of saliency of the approach alarm to a first level that has different magnitudes depending on the type of the preceding vehicle.

10 Claims, 8 Drawing Sheets

(56) References Cited

U.S. PATENT DOCUMENTS

| | | |
|---|---|---|
| 2014/0104050 A1 | 4/2014 | Kuroba et al. |
| 2017/0162054 A1 | 6/2017 | Nespolo et al. |
| 2018/0173236 A1 | 6/2018 | Yashiro et al. |

FOREIGN PATENT DOCUMENTS

| | | |
|---|---|---|
| JP | 2005-63021 A | 3/2005 |
| JP | 2005-280436 A | 10/2005 |
| JP | 2007-245833 A | 9/2007 |
| JP | 2007-328603 A | 12/2007 |
| JP | 2009-262629 A | 11/2009 |
| JP | 2014-89589 A | 5/2014 |
| JP | 2017-4470 A | 1/2017 |
| JP | 2018-101302 A | 6/2018 |
| JP | 2020-30464 A | 2/2020 |
| JP | 2020-183152 A | 11/2020 |
| JP | 2021-86421 A | 6/2021 |
| WO | 2012/157633 A1 | 11/2012 |
| WO | 2021/053822 A1 | 3/2021 |

\* cited by examiner

FIG. 7

| TYPE OF PRECEDING VEHICLE | MOTORCYCLE | FOUR-WHEELED VEHICLE (REGULAR VEHICLE) | MIDDLE-SIZED VEHICLE OR LARGE-SIZED VEHICLE (SUCH AS LARGE-SIZED TRUCK) |
|---|---|---|---|
| TIMING OF RECOGNIZING RISK | LATER | COMPARABLE | COMPARABLE |
| MAGNITUDE OF RISK TO BE ASSESSED | SMALLER | COMPARABLE | LARGER |
| RECOGNITION OF INCREASE IN RISK CAUSED BY DECREASE IN THW | UNDERESTIMATED | COMPARABLE | OVERESTIMATED |

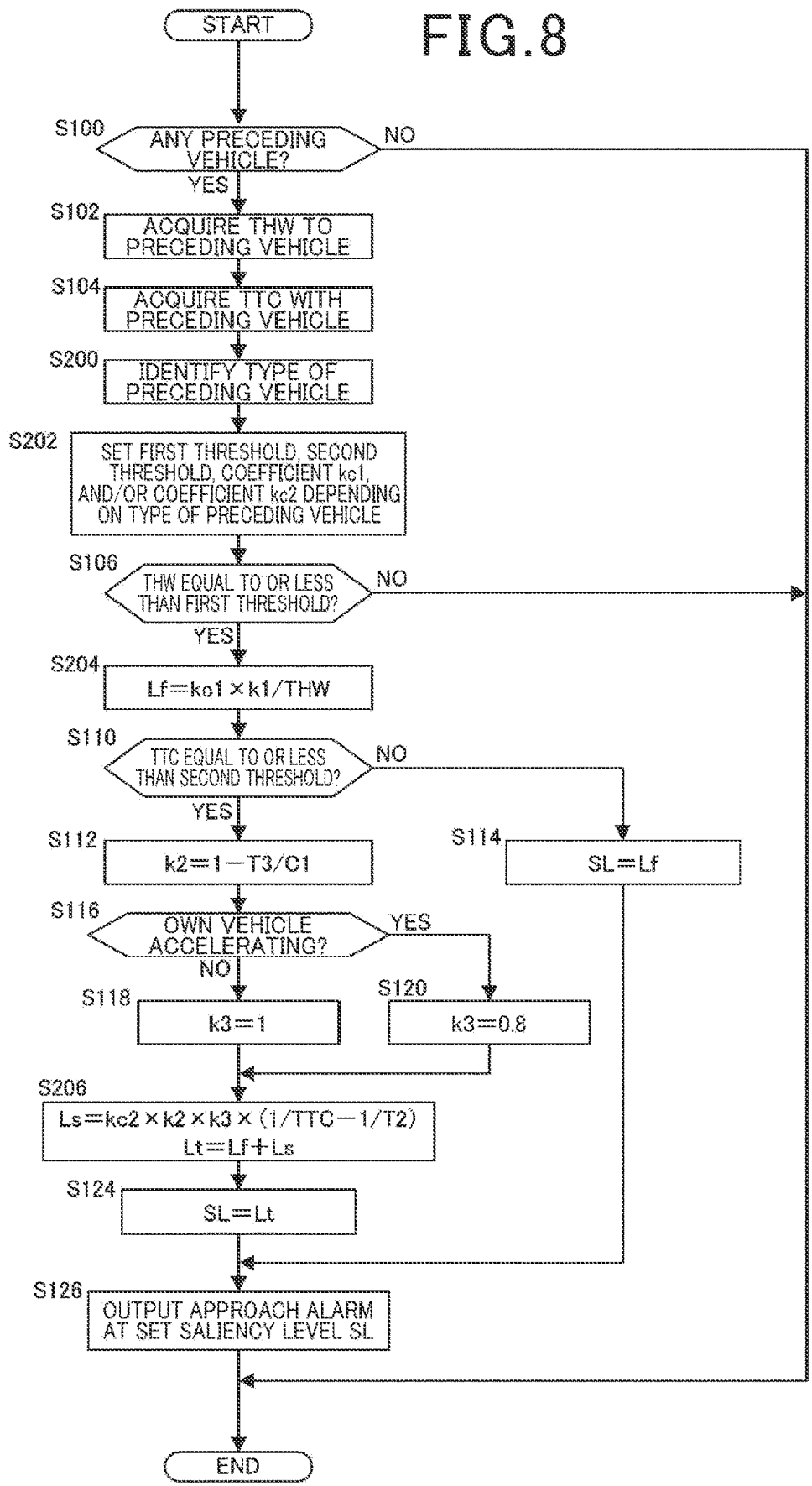

ATTENTION CALLING SYSTEM AND ATTENTION CALLING METHOD

INCORPORATION BY REFERENCE

The present application claims priority under 35 U.S.C. § 119 to Japanese Patent Application No. 2022-174698 filed on Oct. 31, 2022. The content of the application is incorporated herein by reference in its entirety.

BACKGROUND OF THE INVENTION

Field of the Invention

The present invention relates to an attention calling system and an attraction calling method that calls attention of the driver of a vehicle.

Description of the Related Art

In recent years, there is an increased effort to provide access to sustainable transportation systems in consideration of even those vulnerable among traffic participants. In order to achieve this goal, research and development efforts are made for further improvement in traffic safety and convenience through research and development related to preventive safety techniques.

Japanese Patent Laid-Open No. 2009-262629 discloses brake control or the like of an own vehicle. When the own vehicle is traveling between a preceding vehicle and a following vehicle, the brake control is performed based on a risk of collision Rf, which is calculated from time headway THWf and time to collision TTCf between the own vehicle and the preceding vehicle, and a risk of collision Rf with the following vehicle, which is calculated from the time headway THWf and the time to collision TTCf between the own vehicle and the following vehicle.

In the preventive safety techniques, in view of driver's acceptance and understanding of the risk of contact, there is a need to notify to the driver of an own vehicle the magnitude of a temporally changing risk of contact between the own vehicle and the preceding vehicle, in a manner similar to the driver intuitively grasping the risk from the behavior of the preceding vehicle.

Such perception of the driver about the risk of contact, or the like, grasped from the preceding vehicle may vary depending on whether the driver is a skilled expert or a beginner. If it is possible to present the perception of the skilled expert driver to general drivers including beginners, it may be possible to further enhance the traffic safety and convenience.

In order to meet the above need, an object of the present invention is to notify to the driver of an own vehicle the magnitude of a temporally changing risk of collision between the own vehicle and a preceding vehicle, in a manner close to the perception of a skilled driver. Accordingly, the present invention contributes to the development of sustainable transportation systems.

SUMMARY OF THE INVENTION

A first aspect of the present invention is an attention calling system. The attention calling system includes a time headway (THW) acquisition unit that repeatedly acquires THW at predetermined time intervals, the THW being a value obtained by dividing an inter-vehicle distance between own vehicle and a preceding vehicle by vehicle speed of the own vehicle, an identification unit that identifies a type of the preceding vehicle, and an a notification unit that outputs to an occupant of the own vehicle an approach alarm that notifies an approach to the preceding vehicle when the THW becomes a first threshold or less. The notification unit outputs the approach alarm by using the first threshold that takes different values depending on the type of the preceding vehicle, and/or by setting a saliency level that is a degree of saliency of the approach alarm to a first level that has different magnitudes depending on the type of the preceding vehicle.

According to another aspect of the present invention, the notification unit sets the saliency level that is the degree of saliency of the approach alarm to the first level that has different magnitudes depending on the type of the preceding vehicle and that increases monotonically as the THW decreases.

According to another aspect of the present invention, a time to collision (TTC) acquisition unit that repeatedly acquires TTC at predetermined time intervals, the TTC being a value obtained by dividing the inter-vehicle distance by relative speed between the own vehicle and the preceding vehicle. When the THW is equal to or less than the first threshold and the TTC becomes equal to or less than a second threshold, the notification unit sets the saliency level to a third level that is obtained by adding a prescribed second level to the first level, and the notification unit uses the second threshold that takes different values depending on the type of the preceding vehicle, and/or sets the second level to different magnitudes depending on the type of the preceding vehicle.

According to another aspect of the present invention, the notification unit calculates the second level that increases monotonically as the TTC decreases.

According to another aspect of the present invention, the notification unit may set the second level to a larger value as the value of the THW when the TTC becomes equal to or less than the second threshold is smaller.

According to another aspect of the present invention, when a vehicle type indicating the type of the preceding vehicle that is identified by the identification unit is a motorcycle, the notification unit may set the second level to a larger value than when the vehicle type of the preceding vehicle is a four-wheeled vehicle, a medium-sized vehicle, or a large-sized vehicle.

According to another aspect of the present invention, when the vehicle size indicated by the type of the preceding vehicle that is identified by the identification unit is larger, the notification unit sets the second level to a smaller value.

According to another aspect of the present invention, when a vehicle type of the preceding vehicle is a motorcycle, the notification unit may set the first threshold to a larger value than when the vehicle type of the preceding vehicle is a four-wheeled vehicle, a medium-sized vehicle, or a large-sized vehicle.

According to another aspect of the present invention, when a vehicle type of the preceding vehicle is a motorcycle, the notification unit may set the first level to a larger value than when the vehicle type of the preceding vehicle is a four-wheeled vehicle, a medium-sized vehicle, or a large-sized vehicle.

According to another aspect of the present invention, the notification unit may set the first threshold to a larger value as the vehicle size of the preceding vehicle is larger.

Another aspect of the present invention is an attention calling method executed by a computer of an attention calling system. The method includes a time headway (THW)

acquisition step of repeatedly acquiring THW at predetermined time intervals, the THW being a value obtained by dividing an inter-vehicle distance between an own vehicle and a preceding vehicle by vehicle speed of the own vehicle, an identification step of identifying a type of the preceding vehicle, and a notification step of outputting to an occupant of the own vehicle an approach alarm that notifies an approach to the preceding vehicle when the THW becomes equal to or less than a first threshold. In the notification step, the approach alarm is output by using the first threshold that takes different values depending on the type of the preceding vehicle, and/or by setting a saliency level that is a degree of saliency of the approach alarm to a first level that has different magnitudes depending on the type of the preceding vehicle.

The aspects of the present invention make it possible to notify to the driver of an own vehicle the magnitude of a temporally changing risk of collision between the own vehicle and a preceding vehicle, in a manner close to the perception of a skilled driver.

BRIEF DESCRIPTION OF THE DRAWINGS

FIG. 7 is an explanatory view about the tendency of an inexperienced driver in the manner of risk assessment in accordance with the type of a preceding vehicle, in comparison with that of a skilled driver; and FIG. 8 is a flowchart showing the processing procedure of the attention calling method executed by the attention calling system according to the second embodiment.

DETAILED DESCRIPTION OF THE PREFERRED EMBODIMENTS

Hereinafter, embodiments of the present invention will be described with reference to the drawings.

First Embodiment

Figure 1:
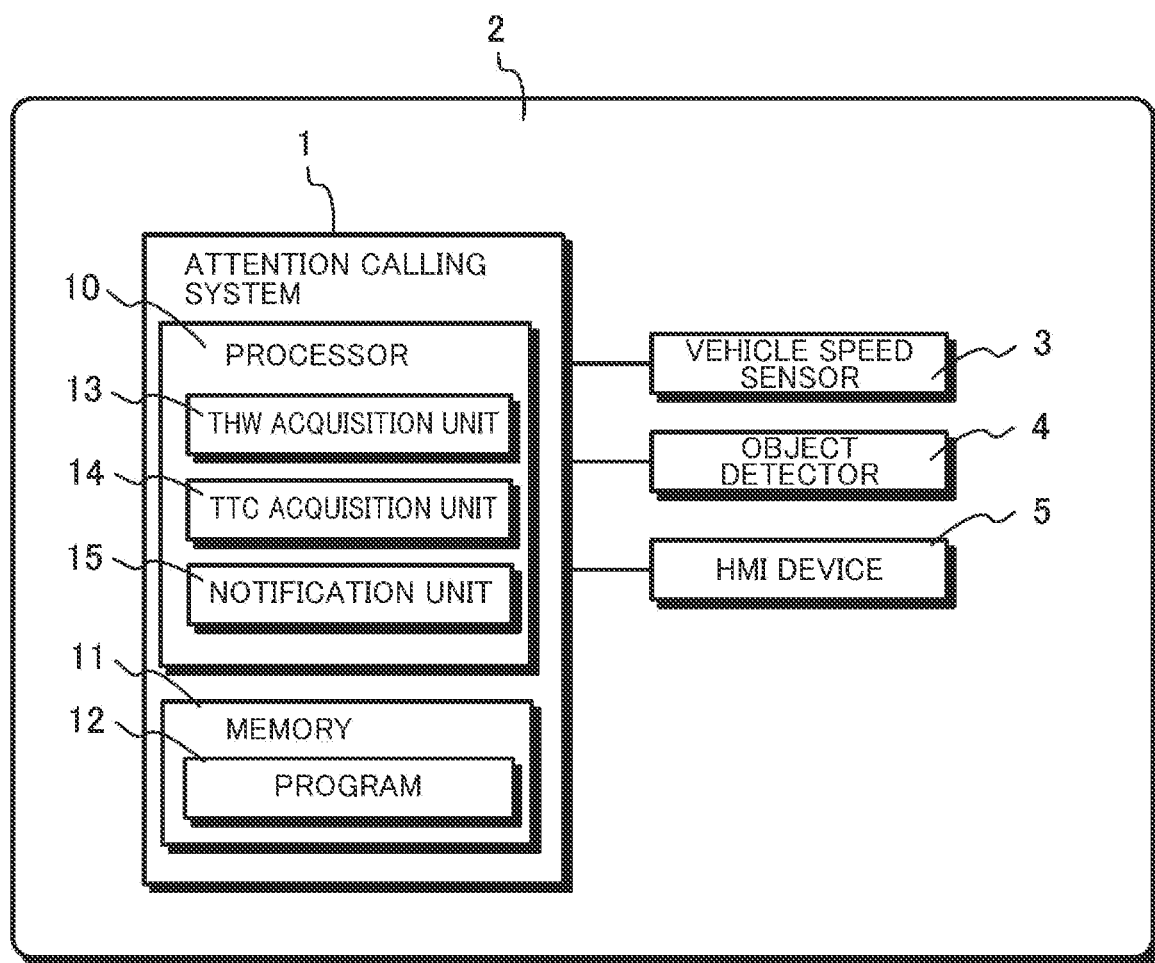
FIG. 1 shows the configuration of an attention calling system according to a first embodiment of the present invention.

FIG. 1 shows the configuration of an attention calling system 1 according to a first embodiment of the present invention.

The attention calling system 1 is mounted on an own vehicle 2 to output an approach alarm that notifies to the driver of the own vehicle 2 an approach to a preceding vehicle. In this context, the 'own vehicle' refers to the vehicle mounted with the attention calling system 1.

The own vehicle 2 includes a vehicle speed sensor 3 that detects the vehicle speed of the own vehicle 2, an object detector 4 that detects an object in front of the own vehicle 2, and a human machine interface (HMI) device 5 provided in a vehicle cabin of the own vehicle 2. Examples of the object detector 4 may include a camera, a radar, a LIDAR, and/or a sonar. The HMI device 5 is, for example, a speaker. The speaker is merely an example, and the HMI device 5 may be any device that can notify to the occupants of the own vehicle 2 including the driver an approach alarm in various ways. Examples of the HMI device 5 may include, in addition to the speaker, an electric seatbelt provided in a driver seat of the own vehicle 2 so as to be able to vary the tension (or fastening force) of a seat belt of the driver seat, a vibration device provided in a steering handle of the own vehicle 2 so as to be able to provide vibration of various intensity to the steering wheel, or a display device.

The attention calling system 1 includes a processor 10 and a memory 11. The memory 11 is constituted of, for example, a volatile and/or non-volatile semiconductor memory, and/or a hard disk device, etc. The processor 10 is a computer including a CPU, for example. The processor 10 may be configured to include a ROM having programs written therein, a RAM for temporary data storage, and so on. The processor 10 includes, as a functional element or a function unit, a THW acquisition unit 13, a TTC acquisition unit 14, and a notification unit 15.

These functional elements included in the processor 10 are implemented when the processor 10 that is a computer executes a program 12 stored in the memory 11. The program 12 may be stored in any computer-readable storage medium. Alternatively, all or some of the functional elements included in the processor 10 may each be constituted of hardware including one or more electronic components.

The THW acquisition unit 13 repeatedly acquires time headway (THW) of the own vehicle 2 to a preceding vehicle traveling ahead of the own vehicle 2 at predetermined time intervals. For example, the THW acquisition unit 13 acquires a current inter-vehicle distance between the preceding vehicle and the own vehicle 2 from the object detector 4 and acquires a current vehicle speed of the own vehicle 2 from the vehicle speed sensor 3 at predetermined time intervals. The THW acquisition unit 13 then acquires a current THW by dividing the current inter-vehicle distance by the current vehicle speed of the own vehicle 2.

The TTC acquisition unit 14 repeatedly acquires a current time to collision (TTC) of the own vehicle 2 with respect to the preceding vehicle 2 with the preceding vehicle at predetermined time intervals. For example, the TTC acquisition unit 14 acquires the current inter-vehicle distance between the preceding vehicle and the own vehicle 2 from the object detector 4 at predetermined time intervals. The TTC acquisition unit 14 then calculates a current relative speed between the preceding vehicle and the own vehicle 2 from the temporal change of the inter-vehicle distance acquired at the predetermined time intervals, divides the current inter-vehicle distance by the calculated current relative speed, and acquires the resultant value as the current TTC.

The notification unit 15 outputs to an occupant of the own vehicle 2, through the HMI device 5, an approach alarm notifying an approach of the own vehicle 2 to the preceding vehicle, based on the THW and the TTC repeatedly acquired by the THW acquisition unit 13 and the TTC acquisition unit 14.

In the present embodiment in particular, the notification unit 15 determines a saliency level that is the degree of saliency of the approach alarm in accordance with the THW and the TTC, and outputs the approach alarm of the determined saliency level through the HMI device.

Hence, the attention calling system 1 outputs an approach alarm at the saliency level that is determined based on the THW indicating the closeness to the preceding vehicle and the TTC indicating the level of approach to the preceding vehicle. This makes it possible to notify to the driver of the own vehicle the magnitude of a temporally changing risk of collision between the own vehicle and the preceding vehicle, in a manner highly consistent with the perception of the driver.

Here, the degree of saliency of the approach alarm refers to how strong the approach alarm calls or attracts the attention of a person.

For example, when the approach alarm is output as sound or vibration, the saliency level is defined by the intensity, frequency, frequency change period, or repetition period of the sound or vibration. The saliency level of the approach alarm provided by sound or vibration is higher as the intensity is higher, the frequency is higher, the frequency change period is shorter, and the repetition period is shorter.

Alternatively, when the approach alarm is output as the tension of the electric seat belt, the saliency level is defined by the magnitude of the tension, and therefore the saliency level of the approach alarm is higher as the tension is larger.

Alternatively, when the approach alarm is output as graphic elements such as characters or graphics displayed on the display device, the saliency level may be defined by the brightness, brightness change period, blinking period, or color tone of the graphic elements to be displayed. For example, the saliency level of the approach alarm is higher as the brightness is higher, the brightness change period or the blinking period is shorter, or the color tone shifts farther to warm color from cold color.

Details of the manner of the approach alarm (the various parameters in the approach alarm, such as the intensity, the frequency, the tension, the brightness, and the brightness change) may be predetermined in accordance with the magnitude of the saliency level. The notification unit 15 may be configured to output the approach alarm in the predetermined manner in accordance with the magnitude of the saliency level specified as shown below.

Specifically, when the THW becomes equal to or less than a first threshold T1, the notification unit 15 sets the saliency level to the magnitude of a first level that increases monotonically as the THW decreases. When the THW is equal to or less than the first threshold T1 and the TTC becomes equal to or less than a second threshold T2, the notification unit 15 sets the saliency level to the magnitude of a third level that is obtained by adding to the first level a second level that increases monotonically with the decrease of the TTC.

As a result, until the TTC becomes equal to or less than the second threshold T2, the approach alarm is output at the saliency level corresponding only to the THW. This makes it possible to prevent an excessive approach alarm from being given to annoy the driver during the period where the risk of contact between the preceding vehicle and the own vehicle 2 is relatively low. During the period where the TTC becomes equal to or less than the second threshold T2 so that there is an urgent risk of contact, the approach alarm is output at the saliency level that is obtained by adding the level corresponding to the TTC, and therefore it is possible to notify the driver the urgent risk of contact.

According to the above configuration, since the first threshold T1, the second threshold T2, the first level, the second level, and the third level are set to the values based on the perception of the skilled driver or the like regarding the risk of collision with the preceding vehicle, it is possible to notify the magnitude of the risk of collision to the driver of the own vehicle in a manner closer to the perception.

For example, the notification unit 15 calculates the first level so as to monotonically increase with respect to an inverse number of the THW, and calculates the second level so as to monotonically increase with respect to an inverse number of the TTC.

As a result, the saliency level does not increase linearly with the decrease of the THW and the TTC, but an increase rate of the saliency level increases as the THW and the TTC decreases. Therefore, the saliency level can vary in the manner closer to the perception or the sense of the driver caused by the approach of the preceding vehicle. This makes it possible to further enhance the driver's acceptance and understanding of the approach alarm.

More specifically, the notification unit 15 calculates a first level value Lf, a second level value Ls, and a third level value Lt in following expressions:

$$Lf = k1/THW \quad (1)$$

$$Ls = k2 \times k3 \times (1/TTC - 1/T2) \quad (2)$$

$$Lt = Lf + Ls \quad (3)$$

where k1, k2, and k3 are proportional coefficients.

The notification unit 15 sets a saliency level SL by a following expression:

$$SL = Lf \text{ when } TTH \geq T1 \text{ and } TTC > T2, \text{ and}$$

$$SL = Lt \text{ when } TTH \geq T1 \text{ and } TTC \leq T2 \quad (4)$$

In setting the saliency level, the notification unit 15 may set the second level Ls to a larger value as the THW value when the TTC becomes equal to or less than the second threshold T2 is smaller. As a result, as the inter-vehicle distance at the moment when the TTC becomes equal to or less than the second threshold T2 is smaller, the saliency level of the approach alarm thereafter can be increased more so as to notify the urgency of the risk of contact to the driver.

For example, the notification unit 15 calculates the proportional coefficient k2 in the expression (2) by a following expression:

$$k2 = 1 - T3/C1 \quad (5)$$

where T3 is the value of THW when the TTC becomes equal to or less than the second threshold T2, and C1 is a coefficient.

The notification unit 15 may also sets the second level Ls when the own vehicle 2 is accelerating to a smaller value than when the own vehicle is not accelerating. As a result, the saliency level of the approach alarm when the driver is intentionally accelerating the own vehicle 2, as in the case where the own vehicle 2 attempts to overtake a preceding vehicle, is lower than the saliency level when the driver is not accelerating the own vehicle 2. This makes it possible to prevent the excessive approach alarm from annoying the driver.

For example, the notification unit 15 determines the proportional coefficient k3 in the expression (2) by a following expression:

$$k3 = 1 \text{ when the own vehicle 2 is not accelerating, and}$$

$$k3 < 1 \text{ (for example, } k3 = 0.8) \text{ when the vehicle 2 is accelerating} \quad (6)$$

For example, when the value of acceleration, calculated from the value of vehicle speed obtained from the vehicle speed sensor 3 at predetermined time intervals, is equal to or more than a prescribed threshold set in advance, the notification unit 15 can determine that the own vehicle 2 is accelerating. Alternatively, the notification unit 15 can determine that the own vehicle 2 is accelerating, when the amount of change in a pressing amount of an accelerator pedal is equal to or more than a predetermined threshold based on information from an accelerator pedal sensor (not shown) included in the own vehicle 2.

Figure 2:
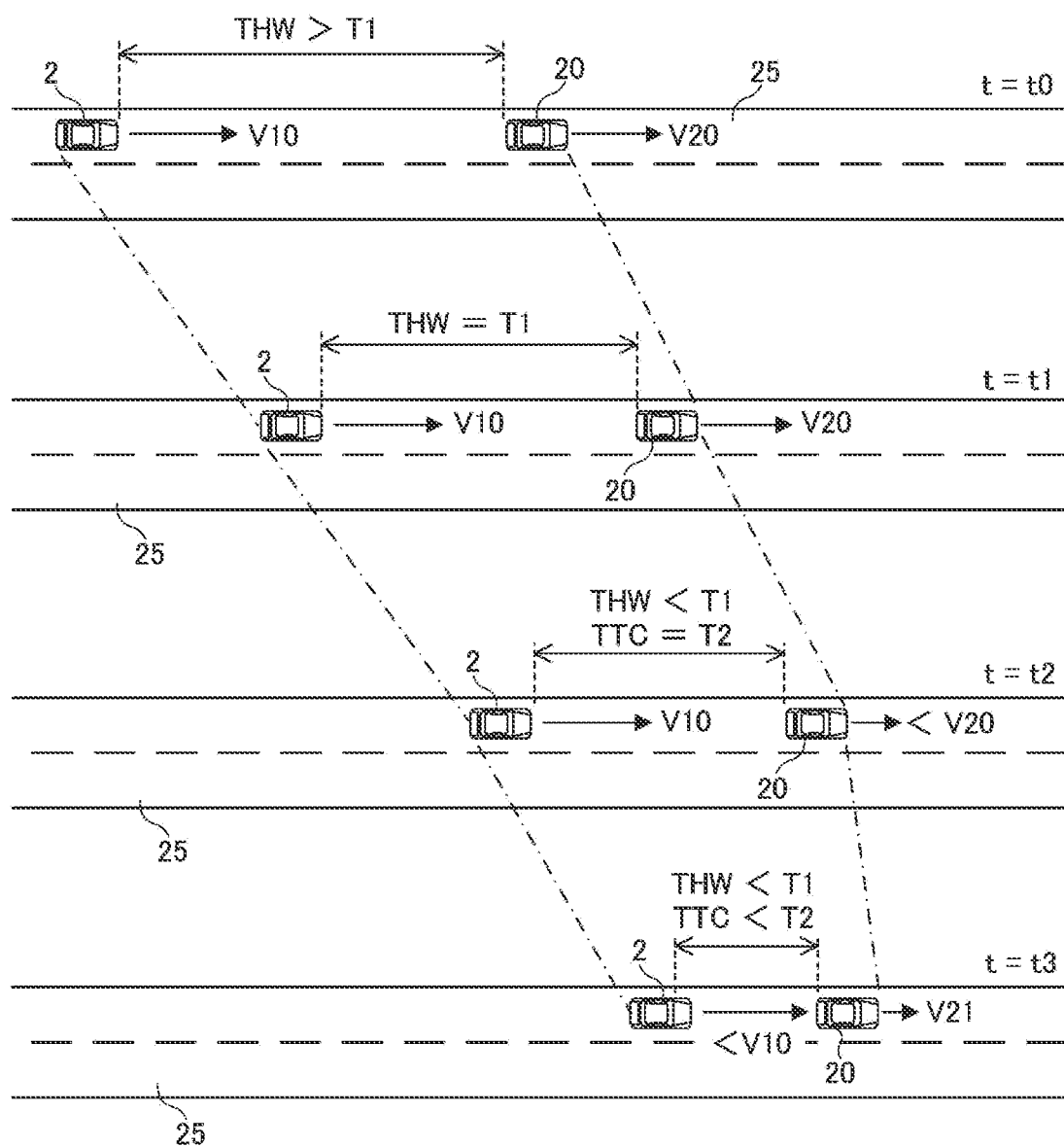
FIG. 2 shows an example of a scene encountered by an own vehicle while the own vehicle is traveling on road.
Figure 3:
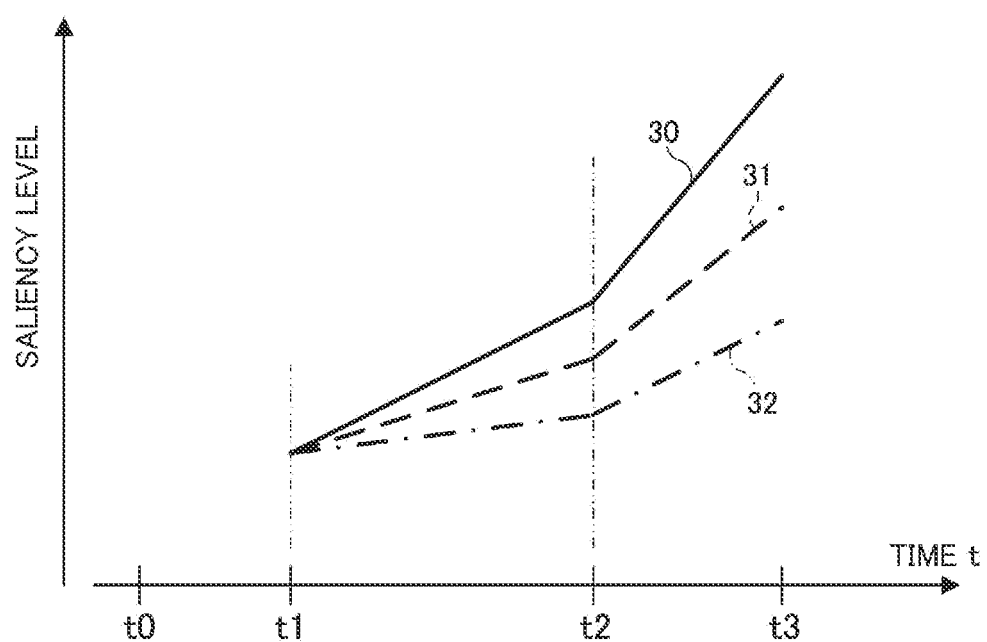
FIG. 3 is an explanatory view about an example of time transition of a saliency level in the scene shown in FIG. 2.

Next, FIGS. 2 and 3 are used to illustrate an example of the time transition in the saliency level of the approach alarm output from the notification unit 15.

FIG. 2 shows an example of a scene encountered by the own vehicle 2 during traveling on road. FIG. 3 is an explanatory view about an example of the time transition of the saliency level in the scene shown in FIG. 2.

FIG. 2 includes uppermost to lowermost views arranged to show the positions of the own vehicle 2 and a preceding vehicle 20 that are traveling on a road 25 at time t0, t1, t2, and t3.

In FIG. 3, the horizontal axis indicates time, and the vertical axis indicates the saliency level. Graphs 30, 31, and 32 show the temporal change of the saliency level.

In the scene shown in FIG. 2, at time t0, the own vehicle 2 and the preceding vehicle 20 are both traveling at constant speeds: the own vehicle 2 at a vehicle speed of V10; and the preceding vehicle 20 at a vehicle speed of V20 (the uppermost view in FIG. 2). In the scene, the vehicle speed V20 of the preceding vehicle 20 is slightly slower than the vehicle speed V10 of the own vehicle 2 (V20<V10), and the THW between the preceding vehicle 20 and the own vehicle 2 gradually decreases.

At time t1, the THW between the preceding vehicle 20 and the own vehicle 2 passes through the first threshold T1 (the second view in FIG. 2), and decreases further with the passage of time.

Then, while the vehicle 2 is traveling at the constant speed, the preceding vehicle 20 starts decelerating from the vehicle speed V20. The TTC between the preceding vehicle 20 and the own vehicle 2 passes through the second threshold T2 at time t2 (the third view in FIG. 2), and further decreases.

Then, after the preceding vehicle 20 reaches a vehicle speed V21 (<V20), the own vehicle 2 starts decelerating from the vehicle speed V10 at time t3, and the TTC starts to increase (the lowermost view in FIG. 2).

The graphs 30, 31, and 32 in FIG. 3 show the respective temporal changes in the saliency level in three cases where, for example, the THW value when the TTC passes through the second threshold T2 at time t2 is different depending on the magnitude of speed difference between the vehicle speed V10 of the own vehicle 2 and the vehicle speed V20 of the preceding vehicle 20.

When the TTC passes through the second threshold T2, the THW value is the largest in the graph 32, the smallest in the graph 30, and is a middle value in the graph 31 in FIG. 3. Here, since the saliency level during a period from time t1 to t2 is set to the first level Lf in the expression (1) that is proportional to the inverse number of the THW, the graph 32 with the highest THW at time t2 indicates the lowest saliency level among the graphs 30 to 32. The graphs 30, 31, and 32 schematically show the changes in the saliency level, and an actual saliency level can change like a curved line.

As described above, according to the proportional coefficient k2 in the expression (5), the notification unit 15 sets the second level Ls indicated in the expression (2) to a larger value, as the THW value when the TTC becomes equal to or less than the second threshold T2 is smaller. Accordingly, an inclination during the period from time t2 to t3 is the largest in the graph 30 and the smallest in the graph 32.

Since the own vehicle 2 starts decelerating at time t3, the saliency level starts decreasing at time t3 in each of the graphs 30, 31, and 32 (not shown).

Figure 4:
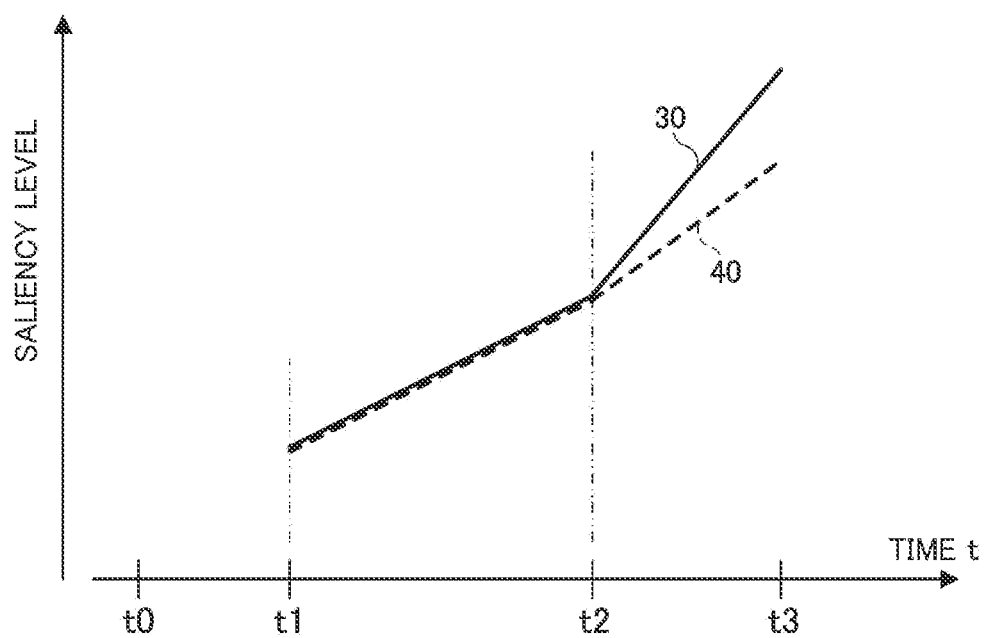
FIG. 4 shows a difference in time transition of the saliency level between the case where the own vehicle is accelerating and the case where the own vehicle is not accelerating.

Although the factor that causes the TTC to pass through the second threshold T2 at time t2 is the deceleration of the preceding vehicle 20 in the scene shown in FIG. 2, the factor may be the acceleration of the own vehicle 2. FIG. 4 shows a difference in time transition of the saliency level between the case where the own vehicle 2 is accelerating and the case where the own vehicle 2 is not accelerating at time t2 when the TTC passes through the second threshold T2. The vertical and the horizontal axes in FIG. 4 are the same as in FIG. 3.

A graph 30 shown in FIG. 4, which is the same as the graph 30 shown in FIG. 3, indicates the time transition of the saliency level in the scene of FIG. 2 where the own vehicle 2 is traveling at the constant speed at time t2. In contrast, a graph 40 shown in FIG. 4 indicates the time transition of the saliency level in the case where the vehicle 2 is accelerating at time t2.

As described above, according to the proportional coefficient k3 shown in the expression (6), when the own vehicle 2 is accelerating, the notification unit 15 sets the second level Ls indicated in the expression (2) to a smaller value than when the own vehicle is not accelerating. Accordingly, an inclination of the graph 40 during the period from time t2 to t3 is smaller than that of the graph 30.

Next, an operation procedure in the attention calling system 1 is described.

Figure 5:
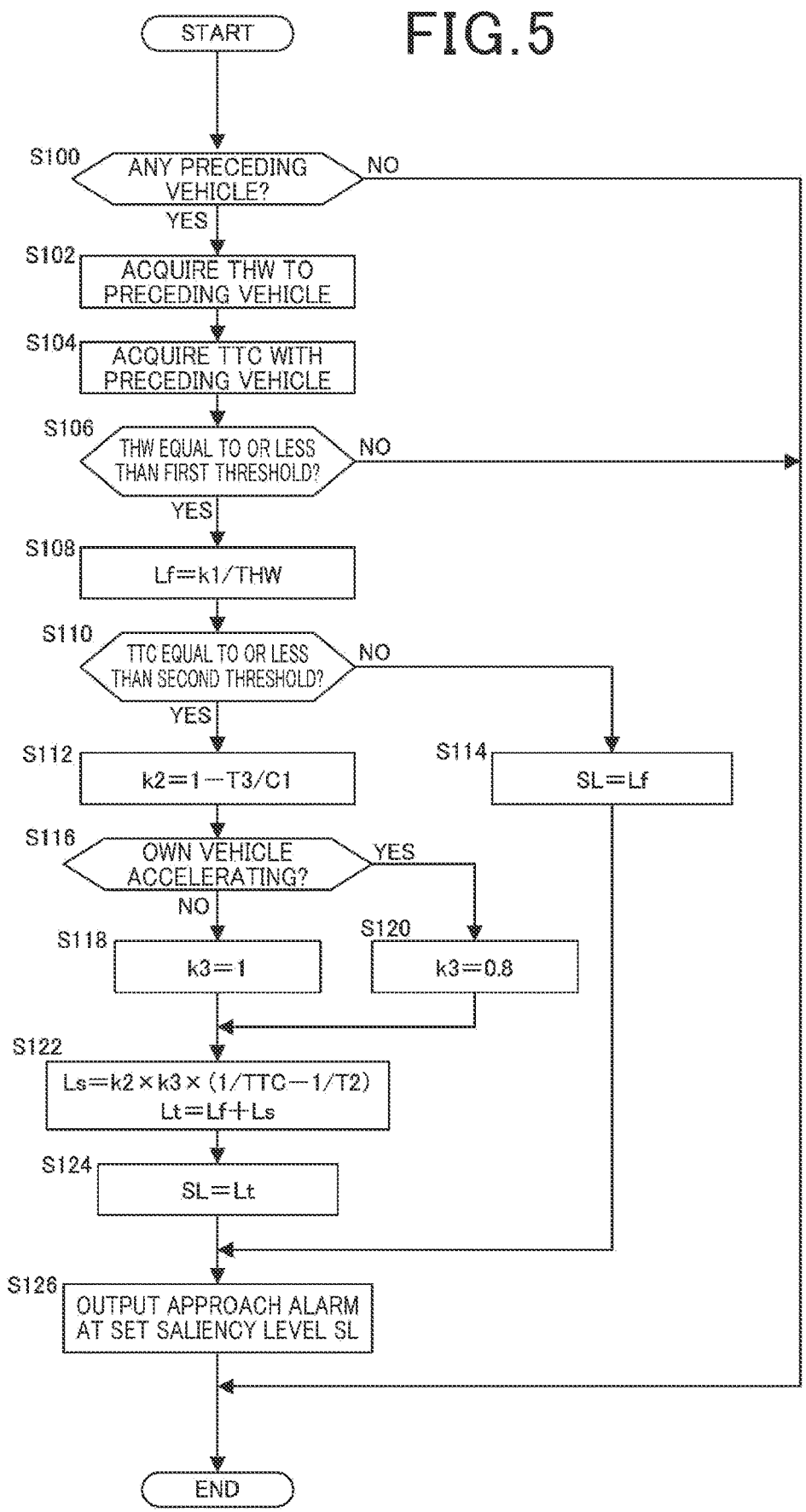
FIG. 5 is a flowchart showing the processing procedure of an attention calling method executed by the attention calling system according to the first embodiment.

FIG. 5 is a flowchart showing the processing procedure of an attention calling method executed by the processor 10 that is the computer of the attention calling system 1. The processing is repeatedly executed at predetermined time intervals.

Once the processing is started, the notification unit 15 determines whether or not there is a preceding vehicle ahead of the own vehicle 2, based on information from the object detector 4 that detects an object ahead of the own vehicle 2 (S100). When there is no preceding vehicle ahead of the own vehicle 2 (S100, NO), the notification unit 15 ends the processing.

When there is a preceding vehicle ahead of the vehicle 2 (S100, YES), the THW acquisition unit 13 acquires the THW of the own vehicle to the preceding vehicle (S102). The TTC acquisition unit 14 acquires the TTC with the preceding vehicle (S104). As described above, since the processing shown in FIG. 5 is repeatedly executed at predetermined time intervals, the THW and the TTC are repeatedly acquired at the predetermined time intervals in steps S102 and S104. Here, steps S102 and S104 correspond to the THW acquisition step and the TTC acquisition step in the present disclosure, respectively. The processing from steps S106 to S126 described later corresponds to the notification step in the present disclosure.

Next, the notification unit 15 determines whether or not the THW acquired in step S102 is equal to or less than the first threshold T1 (S106). When the THW is not equal to or less than the first threshold T1 (S106, NO), the notification unit 15 ends the processing.

When the THW is equal to or less than the first threshold T1 (S106, YES), the notification unit 15 calculates the first level Lf using the above expression (1) (S108).

Next, the notification unit 15 determines whether or not the TTC acquired in step S104 is equal to or less than the second threshold T2 (S110). When the TTC is larger than the second threshold T2 (S108, NO), the notification unit 15 sets the first level Lf calculated in step S108 as the saliency level SL (S114), outputs an approach alarm at the set saliency level SL (S126), and ends the processing.

When the TTC is equal to or less than the second threshold T2 (S110, YES), the notification unit 15 calculates the coefficient k2 for use in the calculation of the second level Ls according to the expression (5) described above (S112).

The notification unit 15 then determines whether or not the own vehicle 2 is accelerating (S116). Then, according to expression (6), the notification unit 15 sets a coefficient k3 for use in the calculation of the second level Ls to 1 when the own vehicle 2 is not accelerating (S118), and sets the coefficient k3 to a value less than 1, that is, for example, 0.8 (S120) when the own vehicle 2 is accelerating (S116, YES).

Next, the notification unit 15 calculates the second level Ls and the third level Lt according to the expressions (2) and (3) (S122). Then, the notification unit 15 sets the calculated third level Lt as the saliency level SL (S124), outputs the approach alarm at the set saliency level SL (S126), and ends the processing.

Second Embodiment

Description is now given of a second embodiment of the present invention.

Figure 6:
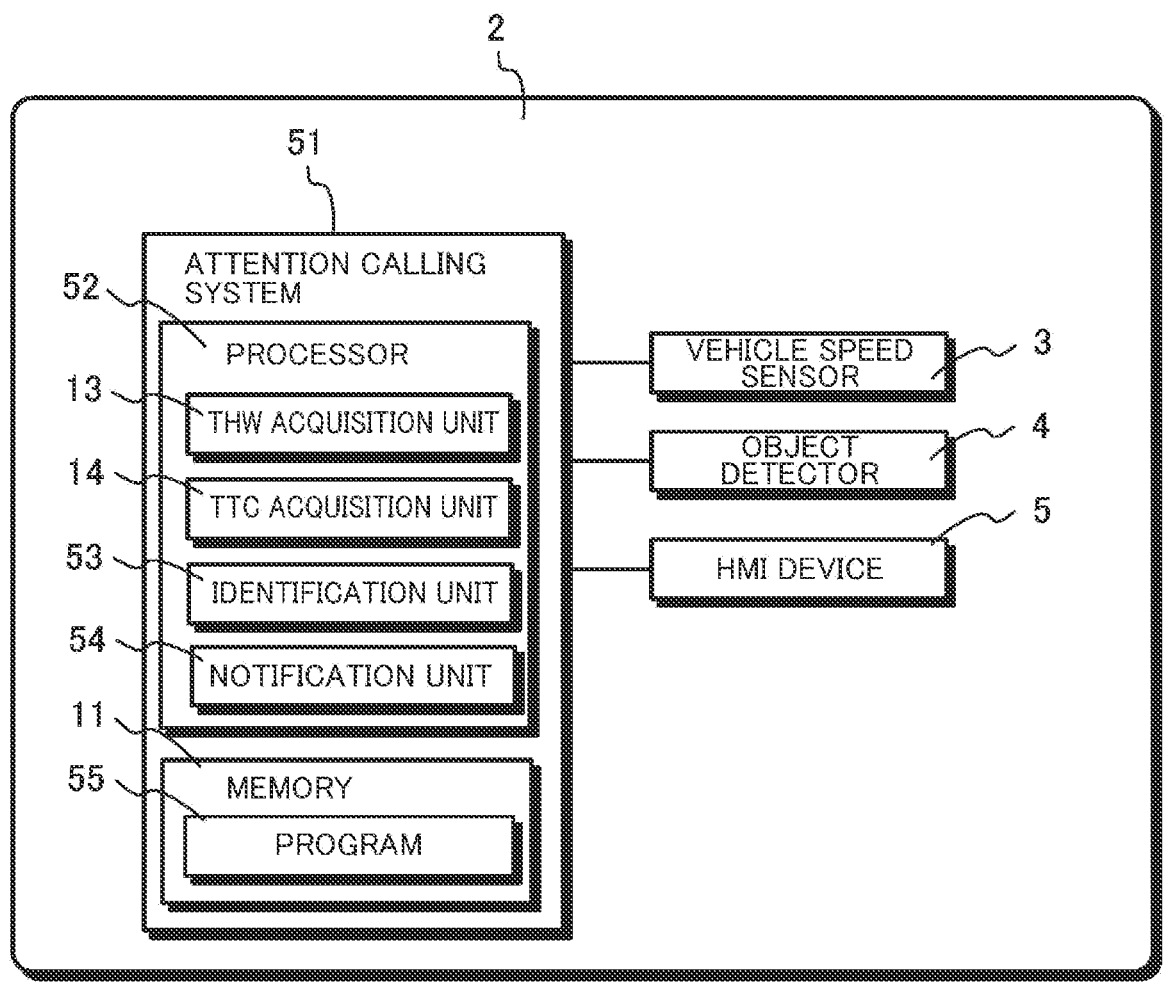
FIG. 6 shows the configuration of an attention calling system according to a second embodiment of the present invention.

FIG. 6 shows the configuration of an attention calling system 51 according to the second embodiment. In FIG. 6, the component members similar to the component members shown in FIG. 1 are designated by the similar signs as in FIG. 1, and the above description about FIG. 1 is used for description here.

The attention calling system 51 shown in FIG. 6 has the same configuration as the attention calling system 1 shown in FIG. 1, except that the processor 10 is replaced with a processor 52. The processor 52 has the same configuration as the processor 10, except that the processor 52 further includes an identification unit 53 as a functional element or a functional unit and that the notification unit 15 is replaced with a notification unit 54.

The processor 52 includes the identification unit 53, the notification unit 54, and other functional elements, which are implemented when the processor 52 that is a computer executes a program 55 stored in the memory 11, for example. The program 55 may be stored in any computer-readable storage medium. Alternatively, all or some of the functional elements included in the processor 52 may each be constituted of hardware including one or more electronic components.

The identification unit 53 identifies the type of the preceding vehicle. Here, the "type" of the preceding vehicle refers to a vehicle category of the preceding vehicle classified based on prescribed items including a vehicle type such as automobiles, motorcycles, passenger vehicles, trucks, and buses, and a vehicle size, such as large-sized vehicles, middle-sized vehicles, and small-sized vehicles.

For example, in accordance with the prior art, the identification unit 53 may be configured to identify the type of the preceding vehicle by performing image processing, such as template matching and feature point matching, based on an image of an object ahead of the own vehicle 2 and/or on measured distance information to the object provided by the object detector 4, or the like. In place of or in addition to the identification unit 53 identifying the type of the preceding vehicle by performing the image processing, the identification unit 53 may acquire from another device the result of identification of the type of the preceding vehicle performed by the another device.

The notification unit 54 has the same configuration as the notification unit 15 in the first embodiment, except that the notification unit 54 issues an approach alert based on the type of the preceding vehicle identified by the identification unit 53.

Specifically, the notification unit 54 outputs the approach alarm by using the first threshold that takes different values depending on the type of the preceding vehicle identified by the identification unit 53, and/or by setting the saliency level that is the degree of saliency of the approach alarm to the first level that has different magnitudes depending on the type of the preceding vehicle.

The values set as the first threshold and the first level may be determined in advance for each type of the preceding vehicle.

Accordingly, when issuing an approach alarm based on the THW indicating the closeness to the preceding vehicle, the attention calling system 1 can set the first threshold and the saliency level of the approach alarm, based on a manner of intuitive risk assessment by a skilled driver or a model driver (hereinafter referred to as the skilled driver or the like) in accordance with the type of the preceding vehicle. This makes it possible to notify to the driver of the own vehicle the magnitude of a temporally changing risk of collision between the own vehicle and the preceding vehicle, in a manner close to the perception of the skilled driver or the like.

In the present embodiment, the notification unit 54 uses the first threshold T1 that takes different values depending on the type of the preceding vehicle and also uses a following expression (7) in place of the expression (1) described above to set the first level value Lf:

$$Lf = kc1 \times k1 / THW \quad (7)$$

where kc1 is a coefficient that is determined according to the type of the preceding vehicle, and k1 is the same as k1 in the expression (1) described above.

As a result, in the present embodiment, the notification unit 54 sets the saliency level of the approach alarm to the first level that has different magnitudes depending on the type of the preceding vehicle and that increases monotonically as the THW decreases. Note that kc1 may be predetermined for each type of the preceding vehicle, for example.

The notification unit 54 also uses the second threshold that takes different values depending on the type of the preceding vehicle, and/or sets the second level to different magnitudes depending on the type of the preceding vehicle. The values set as the second threshold and the second level may be determined in advance for each type of the preceding vehicle.

As a result, the attention calling system 1 can set the second threshold and the second level that defines the saliency level of the approach alarm, based on the manner of intuitive risk assessment by the skilled driver or the like in accordance with the type of the preceding vehicle. Therefore, when issuing the approach alarm at the saliency level that is changed based on the TTC indicating the level of approach to the preceding vehicle, the attention calling system 1 can notify to the driver of the own vehicle the temporal change in the risk of collision, in a manner closer to the perception of the skilled driver or the like.

In the present embodiment, the notification unit 54 uses the second threshold T2 that takes different values depending on the type of the preceding vehicle and also uses a following expression (8) in place of the expression (2) described above to set the second level value Ls:

$$Ls = kc2 \times k2 \times k3 \times (1/TTC - 1/T2) \quad (8)$$

where kc2 is a coefficient that is determined according to the type of the preceding vehicle.

As a result, in the present embodiment, the notification unit 54 sets the second level value so as to have different magnitudes depending on the type of the preceding vehicle and to increase monotonically as the TTC decreases.

Note that kc2 may be predetermined for each type of the preceding vehicle, for example.

In the expression (8), k2 and k3 are the same as k2 and k3 in the expression (2) described above and can be calculated by the expressions (5) and (6) described above, respectively. Specifically, since the notification unit 54 defines k2 by using the expression (5), the notification unit 54 sets the second level value Ls to a larger value, as the value of the THW when the TTC becomes equal to or less than the second threshold T2 is smaller.

FIG. 7 is an explanatory view about the tendency of an inexperienced driver in the manner of risk assessment in accordance with the type of the preceding vehicle, in comparison with that of the skilled driver or the like. In FIG. 7, the uppermost row indicates examples of the type of the preceding vehicle, including motorcycles having two wheels, four-wheeled vehicles having four wheels, and middle-sized vehicles or large-sized vehicles, in order from the left. Here, the four-wheeled vehicles are typically regular vehicles, which may include light vehicles and small-sized vehicles. The medium-sized and large-sized vehicles refer to vehicles which are larger in vehicle size and heavier than the regular vehicles, and may include medium-sized trucks, medium-sized buses, large-sized trucks, large-sized buses and the like. The second rows to fourth rows in FIG. 7 indicate the tendency of the inexperienced driver in the manner of risk assessment. In the table, as an example, the manner of risk assessment is divided into three items: timing to recognize risk; magnitude of risk to be assessed; and recognition of increase in risk caused by decrease in THW, the items corresponding to the second rows to the fourth rows. For example, reference to "later" in the second row in the table indicates that the timing of the inexperienced driver recognizing a risk tends to be later than that of the skilled driver or the like.

In general, the inexperienced drivers, who have gradually been accustomed to driving after driving on public roads for the first time, tend to become overconfident and careless in avoidance of danger. When it comes to recognition of danger, the inexperienced drivers may tend to be self-centered and be caught, for example, in the mindset of focusing on the magnitude of damage that the drivers themselves will suffer in the event of a collision.

Therefore, when the preceding vehicle is a motorcycle that looks smaller than a four-wheeled vehicle (the second column from the left-most column in FIG. 7), the timing of the inexperienced driver to recognize the risk (i.e., the timing of recognizing that special attention should be paid in anticipation of a potential collision in the future) is more likely to be later than the timing of the skilled driver or the like to recognize risk. For the same reason, the degree of the risk assessed by the inexperienced driver may be smaller than the degree of the risk assessed by the skilled driver or the like. Moreover, as for the recognition regarding the increase in risk caused by decrease in THW between the own vehicle and the preceding vehicle, the inexperienced driver is more likely to underestimate the risk than the skilled driver or the like.

When the preceding vehicle is a four-wheeled vehicle frequently encountered on the roads (the third column in FIG. 7), the inexperienced driver and the skilled driver or the like are substantially comparable in the timing of risk recognition, the magnitude of the risk to be assessed, and the recognition of increase in risk caused by decrease in THW.

When the preceding vehicle is a medium-sized vehicle or a large-sized vehicle (for example, a medium-sized truck or a large-sized truck) that is larger in vehicle size and heavier than the regular vehicle that is a typical four-wheeled vehicle (the right-end column in FIG. 7), the inexperienced driver and the skilled driver or the like are comparable in terms of the timing of risk recognition, though the inexperienced driver tends to overestimate the risk as compared with the skilled driver or the like in the recognition of the magnitude of the risk to be assessed and the recognition of increase in risk caused by decrease in THW. This is because while the skilled driver or the like often intuitively understands that, as the size of vehicles increases from four-wheeled vehicles to medium-sized vehicles and large-sized vehicles, the magnitude of acceleration typically decreases during sudden acceleration and deceleration, the inexperienced driver often feels a threat in proportion to the visual size of the preceding vehicle.

The notification unit 54 according to the present embodiment changes the first threshold value that defines the timing to issue an approach alarm based on the THW, the second threshold value that defines the timing to change the rate of increase of the saliency level based on the TTC, and the first level and the second level that define the height of the saliency level of the approach alarm, depending on the type of the preceding vehicle. As a consequence, the notification unit 54 notifies to the driver of the own vehicle the magnitude of a risk of collision between the own vehicle and the preceding vehicle in the manner close to the perception of the skilled driver or the like.

For example, when the vehicle type of the preceding vehicle identified by the identification unit 53 is a motorcycle, the notification unit 54 sets the first threshold T1 to a larger value than when the vehicle type of the preceding vehicle is a four-wheeled vehicle, a medium-sized vehicle, or a large-sized vehicle.

As a result, when the preceding vehicle is a motorcycle, the timing to issue the approach alarm based on the THW comes earlier than when the preceding vehicle is a four-wheel vehicle, a medium-sized vehicle or a large-sized vehicle (i.e., the approach alarm is issued when the preceding vehicle is further away). This makes it possible to call the attention of the inexperienced driver, who tends to disregard the risk of collision with motorcycles as compared with the four-wheeled vehicles, the medium-sized vehicles, or the large-sized vehicles, to the risk of collision with the motorcycles, in the manner of the risk recognition similar to that of the skilled driver or the like.

When the vehicle type of the preceding vehicle is a motorcycle, the notification unit 54 sets the first level Lf to a larger value than when the vehicle type of the preceding vehicle is a four-wheeled vehicle, a medium-sized vehicle, or a large-sized vehicle.

As a result, when the vehicle type of the preceding vehicle is a motorcycle, the saliency level of the approach alarm that starts to be issued based on the THW becomes higher than when the vehicle type is a four-wheeled vehicle, a medium-sized vehicle, or a large-sized vehicle. This makes it possible to call the attention of the inexperienced driver, who tends to disregard the risk of collision with motorcycles as compared with the four-wheeled vehicles, the medium-sized vehicles, or the large-sized vehicles, to the risk of collision with the motorcycles, in a manner of recognizing the same magnitude of the risk as the skilled driver or the like for the motorcycles.

The notification unit 54 also sets the first threshold T1 to a larger value as the vehicle size of the preceding vehicle is larger. In other words, the larger the vehicle size of the preceding vehicle is, the earlier the notification unit 54 moves forward the timing of issuing the approach alarm based on the THW. This makes it possible to call the attention of, for example, a potentially dangerous driver, who tends to underestimate the risk regarding the medium-sized vehicles or the large-sized vehicles such as trucks and buses, to the risk of collision with the medium-sized vehicles and the large-sized vehicles, in the manner of risk recognition similar to that of the skilled driver or the like.

When the vehicle type of the preceding vehicle identified by the identification unit 53 is a motorcycle, the notification unit 54 sets the second level Ls to a larger value than when the vehicle type of the preceding vehicle is a four-wheeled vehicle, a medium-sized vehicle, or a large-sized vehicle. As a result, when the vehicle type of the preceding vehicle is a motorcycle, the rate of increase of the saliency level based on the TTC is made higher than when the vehicle type is a four-wheeled vehicle, a medium-sized vehicle, or a large-sized vehicle. This makes it possible to call the attention of the inexperienced driver, who tends to disregard the risk of collision with motorcycles as compared with the four-wheeled vehicles, the medium-sized vehicles, or the large-sized vehicles, to the risk of collision with the motorcycles, in a manner of recognizing the same magnitude of the risk as the skilled driver or the like in the event of approaching the motorcycles.

When the vehicle size indicated by the type of the preceding vehicle identified by the identification unit 53 is larger, the notification unit 54 sets the second level Ls to a smaller value. This makes it possible to set the rate of increase of the saliency level based on the TTC to be more gradual as the vehicle size of the preceding vehicle is larger, so that the manner of the risk recognition by the skilled driver or the like can be presented as a reference for driving to the inexperienced driver, who tends to be distracted by the vehicle size of the preceding vehicle and overestimate the risk.

Next, an operation procedure in the attention calling system 51 is described.

FIG. 8 is a flowchart showing the processing procedure of an attention calling method executed by the processor 52 that is the computer of the attention calling system 51. This processing is repeatedly executed at predetermined time intervals. In FIG. 8, the steps for performing the same processing as the steps of the attention calling method executed by the attention calling system 1 according to the first embodiment shown in FIG. 5 are designated by the same signs as shown in FIG. 5, and the description about FIG. 5 shown above is used for description here.

The attention calling method in FIG. 8 executed by the attention calling system 51 is the same as the attention calling method in FIG. 5 executed by the attention calling system 1, except that the attention calling method in FIG. 8 further includes steps S200 and S202, and steps S108 and S122 are replaced with steps S204 and S206. Here, step S200 corresponds to the identification step in the present disclosure. In addition, the processing of steps S202, S204, S206 and steps S106 to S126 correspond to the notification step executed by the computer of the attention calling system 51 in the present disclosure.

When there is a preceding vehicle ahead of the own vehicle 2 (S100, YES), the attention calling system 51 acquires the THW to the preceding vehicle using the THW acquisition unit 13 (S102). After acquiring the TTC with the preceding vehicle using the TTC acquisition unit 14 (S104), the attention calling system 51 uses the identification unit 53 to identify the type of the preceding vehicle (S200). Then, the notification unit 54 sets the first threshold T1, the second threshold T2, the coefficient kc1, and/or the coefficient kc2, depending on the type of the preceding vehicle (S202).

The notification unit 54 then calculates the first level value Lf according to the expression (7) described above (S204). The notification unit 54 also calculates the second level value Ls according to the expression (8) described above, and calculates the third level value Lt according to the expression (3) (S206).

OTHER EMBODIMENTS

In the second embodiment described above, although the notification unit 54 is configured to set the first threshold T1, the second threshold T2, the coefficients Kc1, and the coefficient Kc2 to values corresponding to the type of the preceding vehicle, the notification unit 54 may be configured to set at least one of T1, T2, Kc1 and kc2 to the value corresponding to the type of the preceding vehicle. In this case, while the effect is limited to some extend as compared with the second embodiment, using any one of the parameters (i.e., T1, T2, Kc1 and kc2) that is set in accordance with the type of the preceding vehicle makes it possible to notify to the driver of the own vehicle 2 the magnitude of a temporally changing risk of collision between the own vehicle and the preceding vehicle to a certain extent, in the manner close to the perception of the skilled driver or the like.

In the case of not setting kc1 or kc2 to the value corresponding to the type of the preceding vehicle, the notification unit 54 can execute step S108 or S122 in FIG. 5 for calculating the first level value Lf or the second level value Ls using the expression (1) or (2), instead of step S204 or S206 in the flowchart shown in FIG. 8.

In the second embodiment described above, while motorcycles, four-wheeled vehicles, medium-sized vehicles and large-sized vehicles are illustrated as the types of the preceding vehicle in FIG. 7, the details and the number of the types of the preceding vehicle identified by the identification unit 53 are not limited to these, and may be any details and any number of the types of the preceding vehicle. The notification unit 54 may also be configured to set the first threshold T1, the second threshold T2, the coefficient Kc1 and/or the coefficient kc2 corresponding to each type of the preceding vehicle identified by the identification unit 53. Examples of the type of the preceding vehicle to be identified may include various types that are different in application, size and/or shape, such as bicycles, electric kickboards, motorcycles with sidecars, light trucks, micro buses, medium-sized buses, large-sized buses, and vehicles carrying hazardous materials.

Without being limited to the embodiments disclosed, the present invention can be carried out in various modes without departing from the meaning thereof.

Configurations Supported by Embodiments

The embodiments disclosed support the following configurations.

(Configuration 1) An attention calling system, including a time headway (THW) acquisition unit that repeatedly acquires THW at predetermined time intervals, the THW being a value obtained by dividing an inter-vehicle distance between an own vehicle and a preceding vehicle by vehicle speed of the own vehicle, an identification unit that identifies a type of the preceding vehicle, and a notification unit that outputs to an occupant of the own vehicle an approach alarm that notifies an approach to the preceding vehicle, when the THW becomes a first threshold or less. The notification unit outputs the approach alarm by using the first threshold that takes different values depending on the type of the preceding vehicle, and/or by setting a saliency level that is a degree of saliency of the approach alarm to a first level that has different magnitudes depending on the type of the preceding vehicle.

According to the attention calling system in the configuration 1, when issuing an approach alarm based on the THW indicating the closeness to the preceding vehicle, the attention calling system can set the first threshold and the first level defining the saliency level of the approach alarm, based on a manner of intuitive risk assessment by a skilled driver or a model driver (hereinafter referred to as the skilled driver or the like) in accordance with the type of the preceding vehicle. This makes it possible to notify to the driver of the own vehicle the magnitude of a temporally changing risk of collision between the own vehicle and the preceding vehicle in a manner close to the perception of the skilled driver or the like.

(Configuration 2) The attention calling system according to the configuration 1, in which the notification unit sets the saliency level that is the degree of saliency of the approach alarm to the first level that has different magnitudes depending on the type of the preceding vehicle and that increases monotonically as the THW decreases.

According to the attention calling system in the configuration 2, since the saliency level of the approach alarm increases with the decrease in THW caused by decrease in inter-vehicle distance to the preceding vehicle, the saliency level may change in a manner consistent with the perception or the sense of the driver subjectivity or sensation of the driver in the event of an approach of the preceding vehicle. Therefore, the attention calling system in the configuration 2 can enhance the understanding of the driver for the approach alarm.

(Configuration 3) The attention calling system according to the configuration 1 or 2, including a time to collision (TTC) acquisition unit that repeatedly acquires TTC at predetermined time intervals, the TTC being a value obtained by dividing the inter-vehicle distance by relative speed between the own vehicle and the preceding vehicle, in which when the THW is equal to or less than the first threshold and the TTC becomes equal to or less than a second threshold, the notification unit sets the saliency level to a third level that is obtained by adding a prescribed second level to the first level, and the notification unit uses the second threshold that takes different values depending on the type of the preceding vehicle, and/or sets the second level to different magnitudes depending on the type of the preceding vehicle.

The attention calling system in the configuration 3 can set the second threshold and the second level defining the saliency level of the approach alarm, based on a manner of intuitive risk assessment by a skilled driver or the like depending on the type of the preceding vehicle. Therefore, when issuing the approach alarm at the saliency level that is changed based on the TTC indicating the level of approach to the preceding vehicle, the attention calling system can notify to the driver of the own vehicle the temporal change in the risk of collision, in a manner closer to the perception of the skilled driver or the like.

(Configuration 4) The attention calling system according to the configuration 3, in which the notification unit calculates the second level that increases monotonically as the TTC decreases.

According to the attention calling system in the configuration 4, the value of the second level that defines the saliency level of the approach alarm is made higher as the TTC that is the time until collision with the vehicle ahead decreases, so that the value of the second level changes with the decrease in the TTC in the manner consistent with the perception or the sensation of the driver. Therefore, the attention calling system in the configuration 4 can enhance the driver's understanding of the increase in the level of the approach alarm based on the TTC.

(Configuration 5) The attention calling system according to the configuration 3 or 4, in which the notification unit sets the second level to a larger value as the value of the THW when the TTC becomes equal to or less than the second threshold is smaller.

According to the attention calling system in the configuration 5, as the inter-vehicle distance at the moment when the TTC becomes equal to or less than the second threshold is smaller, the saliency level of the approach alarm thereafter can be increased more so as to notify the urgency of the risk of contact to the driver.

(Configuration 6) The attention calling system according to any one of the configurations 3 to 5, in which when a vehicle type of the preceding vehicle identified by the identification unit is a motorcycle, the notification unit sets the second level to a larger value than when the vehicle type of the preceding vehicle is a four-wheeled vehicle, a medium-sized vehicle, or a large-sized vehicle.

According to the attention calling system in the configuration 6, when a vehicle type of the preceding vehicle is a motorcycle, the rate of increase of the saliency level based on the TTC is made higher than when the vehicle type is a four-wheeled vehicle, a medium-sized vehicle, or a large-sized vehicle. This makes it possible to call the attention of the inexperienced driver, who tends to disregard the risk of collision with motorcycles as compared with the four-wheeled vehicles, the medium-sized vehicles, or the large-sized vehicles, to the risk of collision with the motorcycles, in a manner of recognizing the same magnitude of the risk as the skilled driver or the like for the approach of the motorcycles.

(Configuration 7) The attention calling system according to any one of the configurations 3 to 6, in which when the vehicle size indicated by the type of the preceding vehicle that is identified by the identification unit is larger, the notification unit sets the second level to a smaller value.

The attention calling system in the configuration 7 makes it possible to set the rate of increase of the saliency level based on the TTC to be more gradual as the vehicle size of the preceding vehicle is larger, so that the manner of the risk recognition by the skilled driver or the like can be presented as a reference for driving to the inexperienced driver, who tends to be distracted by the vehicle size of the preceding vehicle and overestimate the risk.

(Configuration 8) The attention calling system according to any one of the configurations 1 to 7, in which when a vehicle type of the preceding vehicle is a motorcycle, the notification unit sets the first threshold to a larger value than when the vehicle type of the preceding vehicle is a four-wheeled vehicle, a medium-sized vehicle, or a large-sized vehicle.

According to the attention calling system in the configuration 8, when the preceding vehicle is a motorcycle, the timing to issue the approach alarm based on the THW comes earlier than when the preceding vehicle is a four-wheeled vehicle, a medium-sized vehicle or a large-sized vehicle (i.e., the approach alarm is issued when the preceding vehicle is further away). This makes it possible to call the attention of the inexperienced driver, who tends to disregard the risk of collision with motorcycles as compared with the four-wheeled vehicles, the medium-sized vehicles, or the large-sized vehicles, to the risk of collision with the motorcycles, in a manner of the risk recognition similar to that of the skilled driver or the like.

(Configuration 9) The attention calling system according to any one of the configurations 1 to 8, in which when a vehicle type of the preceding vehicle is a motorcycle, the notification unit sets the first level to a larger value than when the vehicle type of the preceding vehicle is a four-wheeled vehicle, a medium-sized vehicle, or a large-sized vehicle.

According to the attention calling system in the configuration 9, when a vehicle type of the preceding vehicle is a motorcycle, the saliency level of the approach alarm that starts to be issued based on the THW becomes higher than when the vehicle type of the preceding vehicle is a four-wheeled vehicle, a medium-sized vehicle, or a large-sized vehicle. This makes it possible to call the attention of the inexperienced driver, who tends to disregard the risk of collision with motorcycles as compared with the four-wheeled vehicles, the medium-sized vehicles, or the large-sized vehicles, to the risk of collision with the motorcycles, in the manner of recognizing the same magnitude of the risk as the skilled driver or the like for the motorcycles.

(Configuration 10) The attention calling system according to any one of the configurations 1 to 9, in which the notification unit sets the first threshold to a larger value as the vehicle size of the preceding vehicle is larger.

According to the attention calling system in the configuration 10, as the vehicle size of the preceding vehicle is larger, the timing of issuing the approach alarm based on the THW is advanced more. This makes it possible to call the attention of, for example, a potentially dangerous driver, who tends to underestimate the risk regarding the medium-sized vehicles or the large-sized vehicles such as trucks and buses, to the risk of collision with the medium-sized vehicles and the large-sized vehicles, in the manner of risk recognition similar to that of the skilled driver or the like.

(Configuration 11) An attention calling method executed by a computer of an attention calling system, including a time headway (THW) acquisition step of repeatedly acquiring THW at predetermined time intervals, the THW being a value obtained by dividing an inter-vehicle distance between an own vehicle and a preceding vehicle by vehicle speed of the own vehicle, an identification step of identifying a type of the preceding vehicle, and a notification step of outputting to an occupant of the own vehicle an approach alarm that notifies an approach to the preceding vehicle when the THW becomes equal to or less than a first threshold. In the notification step, the approach alarm is output by using the first threshold that takes different values depending on the type of the preceding vehicle, and/or by setting a saliency level that is a degree of saliency of the approach alarm to a first level that has different magnitudes depending on the type of the preceding vehicle.

According to the attention calling method in the configuration 11, when issuing an approach alarm based on the THW indicating the closeness to the preceding vehicle, the first threshold and the saliency level of the approach alarm can be set in accordance with a manner of intuitive risk assessment by a skilled driver or a model driver (hereinafter referred to as the skilled driver or the like) depending on the type of the preceding vehicle. This makes it possible to notify to the driver of the own vehicle the magnitude of a temporally changing risk of collision between the own vehicle and the preceding vehicle in a manner close to the perception of the skilled driver or the like.

REFERENCE SIGNS LIST 1, 51 . . . attention calling system, 2 . . . own vehicle, 3 . . . vehicle speed sensor, 4 . . . object detector, 5 . . . HMI device, 10, 52 . . . processor, 11 . . . memory, 12, 55 . . . program, 13 . . . THW acquisition unit, 14 . . . TTC acquisition unit, 15, 54 . . . notification unit, 20 . . . preceding vehicle 25 . . . road, 53 . . . identification unit

What is claimed is:

1. An attention calling system, comprising a processor configured to:
    repeatedly acquire time headway (THW) at predetermined time intervals, the THW being a value obtained by dividing an inter-vehicle distance between an own vehicle and a preceding vehicle by vehicle speed of the own vehicle;
    identify a type of the preceding vehicle; and
    output to an occupant of the own vehicle an approach alarm that notifies an approach to the preceding vehicle when the THW becomes equal to or less than a first threshold, wherein
    the processor outputs the approach alarm by using the first threshold that takes different values depending on the type of the preceding vehicle, and/or by setting a saliency level that is a degree of saliency of the approach alarm to a first level that has different magnitudes depending on the type of the preceding vehicle,
    the processor is configured to repeatedly acquire a time to collision (TTC) at predetermined time intervals, the TTC being a value obtained by dividing the inter-vehicle distance by relative speed between the own vehicle and the preceding vehicle,
    when the THW is equal to or less than the first threshold and the TTC becomes equal to or less than a second threshold, the processor sets the saliency level to a third level that is obtained by adding a prescribed second level to the first level, and
    the processor uses the second threshold that takes different values depending on the type of the preceding vehicle, and/or sets the second level to different magnitudes depending on the type of the preceding vehicle.

2. The attention calling system according to claim 1, wherein
    the processor sets the saliency level that is the degree of saliency of the approach alarm to the first level that has different magnitudes depending on the type of the preceding vehicle and that increases monotonically as the THW decreases.

3. The attention calling system according to claim 1, wherein
    the processor calculates the second level that increases monotonically as the TTC decreases.

4. The attention calling system according to claim 1, wherein
the processor sets the second level to a larger value as the value of the THW when the TTC becomes equal to or less than the second threshold is smaller.

5. The attention calling system according to claim 1, wherein
when a vehicle type indicated by the type of the preceding vehicle that is identified is a motorcycle, the processor sets the second level to a larger value than when the vehicle type of the preceding vehicle is a four-wheeled vehicle, a medium-sized vehicle, or a large-sized vehicle.

6. The attention calling system according to claim 1, wherein
when the vehicle size indicated by the type of the preceding vehicle that is identified is larger, the processor sets the second level to a smaller value.

7. The attention calling system according to claim 1, wherein
when a vehicle type of the preceding vehicle is a motorcycle, the processor sets the first threshold to a larger value than when the vehicle type of the preceding vehicle is a four-wheeled vehicle, a medium-sized vehicle, or a large-sized vehicle.

8. The attention calling system according to claim 1, wherein
when a vehicle type of the preceding vehicle is a motorcycle, the processor sets the first level to a larger value than when the vehicle type of the preceding vehicle is a four-wheeled vehicle, a medium-sized vehicle, or a large-sized vehicle.

9. The attention calling system according to claim 1, wherein
the processor sets the first threshold to a larger value as a vehicle size of the preceding vehicle is larger.

10. An attention calling method executed by a computer of an attention calling system, comprising:
a time headway (THW) acquisition step of repeatedly acquiring THW at predetermined time intervals, the THW being a value obtained by dividing an inter-vehicle distance between an own vehicle and a preceding vehicle by vehicle speed of the own vehicle;
an identification step of identifying a type of the preceding vehicle; and
a notification step of outputting to an occupant of the own vehicle an approach alarm that notifies an approach to the preceding vehicle when the THW becomes equal to or less than a first threshold, wherein
in the notification step, the approach alarm is output by using the first threshold that takes different values depending on the type of the preceding vehicle, and/or by setting a saliency level that is a degree of saliency of the approach alarm to a first level that has different magnitudes depending on the type of the preceding vehicle,
the attention calling method further comprises a time to collision (TTC) acquisition step that repeatedly acquires TTC at predetermined time intervals, the TTC being a value obtained by dividing the inter-vehicle distance by relative speed between the own vehicle and the preceding vehicle,
when the THW is equal to or less than the first threshold and the TTC becomes equal to or less than a second threshold, in the notification step, the saliency level is set to a third level that is obtained by adding a prescribed second level to the first level, and
in the notification step, the second threshold that takes different values depending on the type of the preceding vehicle is used, and/or the second level is set to different magnitudes depending on the type of the preceding vehicle.

\* \* \* \* \*